United States Patent [19]
Bushman

[11] Patent Number: 5,514,926
[45] Date of Patent: May 7, 1996

[54] POWER TRANSFER APPARATUS AND METHOD

[75] Inventor: Boyd B. Bushman, Lewisville, Tex.

[73] Assignee: Lockheed Corporation, Fort Worth, Tex.

[21] Appl. No.: 249,537

[22] Filed: May 26, 1994

[51] Int. Cl.⁶ .............................. H02K 49/10; H02K 7/10
[52] U.S. Cl. ........................ 310/105; 310/103; 310/75 D
[58] Field of Search .................... 310/75 D, 80, 310/103, 105, 152

[56] References Cited

U.S. PATENT DOCUMENTS

| | | | |
|---|---|---|---|
| 1,962,659 | 6/1934 | Kautz | 310/103 |
| 2,263,264 | 11/1941 | Duwe | 310/103 |
| 2,722,617 | 11/1955 | Cluwen et al. | 310/103 |
| 2,872,601 | 2/1959 | Fauvelot | 310/105 |
| 3,125,697 | 3/1964 | Sloan | 310/105 |
| 3,162,783 | 12/1964 | Zozulin | 310/105 |
| 3,179,240 | 4/1965 | Kain | 198/202 |
| 3,523,204 | 8/1970 | Rand | 310/103 |
| 4,187,453 | 2/1980 | Rough | 310/12 |
| 4,486,176 | 12/1984 | Tardieu et al. | 310/103 |
| 4,535,434 | 8/1985 | Kishi | 310/103 |
| 4,550,283 | 10/1985 | Leach et al. | 310/178 |
| 4,803,387 | 2/1989 | Seider | 310/12 |
| 4,834,628 | 5/1989 | Laing | 417/420 |

FOREIGN PATENT DOCUMENTS

| | | | |
|---|---|---|---|
| 212598 | 8/1909 | Germany | 310/105 |
| 581107 | 10/1946 | United Kingdom | 310/105 |
| 887143 | 1/1962 | United Kingdom | 310/105 |

*Primary Examiner*—Clayton E. LaBalle
*Attorney, Agent, or Firm*—James E. Bradley

[57] ABSTRACT

A method for transferring power employs moving a magnetic field past a nonmagnetic electrical conductor surface. In one instance, a magnet is mounted on a rotational axis, with the periphery of the magnet in close proximity to the object. The object may also be on a rotational axis. Rotating of the magnet causes rotation of the object. In another instance, an aluminized layer is placed on a conveyor belt. The rotating magnet is positioned closed to the conveyor belt layer to cause the conveyor belt to move.

7 Claims, 2 Drawing Sheets

5,514,926

POWER TRANSFER APPARATUS AND METHOD

BACKGROUND OF THE INVENTION

1. Field of the Invention

This invention relates in general to a method of causing movement of objects with the use of magnets, and particularly to a means for transferring motion of a magnet field to a nonmagnetic electrical conductor object.

2. Summary of the Prior Art

Rotary power is transferred from one shaft to another by means such as by gears. The gears intermesh, and rotation of the drive shaft creates rotation of the driven shaft. Similarly, belts and pulleys will transmit rotary motion from one shaft to another. Conveyor belts are driven typically by a driven roller which is rotated on a shaft or axle, the friction of the roller against the belt causing rotation of the belt.

The prior art systems, including those using gears, all require frictional engagement. This results in power loss. Also, lubrication is frequently needed.

Magnetic force has been employed in connection with electrical motors to transfer electrical energy to rotation of an output shaft. For example, alternating current on a stationary stator will induce rotational movement of an armature or rotor. Also, magnetic force has been used to attract ferrous metals for separation purposes.

However, in the prior art magnetic force has been considered to have no effect on nonferrous electrically conductive metals such as aluminum, silver or gold. These nonferrous electrical conductors are considered to be nonresponsive to magnetic force.

SUMMARY OF THE INVENTION

For reasons not entirely clear, applicant's have discovered that rapidly moving a magnetic field through a nonferrous electrical conductor can cause movement of the electrical conductor. This is employed in one instance by mounting a permanent magnet to a drive shaft and rotating the drive shaft. The periphery of the magnet is spaced close to the periphery of the electrical conductor object. The object in one instance may be mounted on an object axis. The rotating magnetic field produced by the magnet induces rotation of the object about the object axis.

In another instance, a conveyor belt has a layer coated with a nonferrous electrical conductor such as aluminum. The rotating magnet is placed in close proximity to the conductive layer on the conveyor belt. The rotating magnetic force induces linear movement of the conveyor belt.

DETAILED DESCRIPTION OF THE INVENTION

Figure 1:
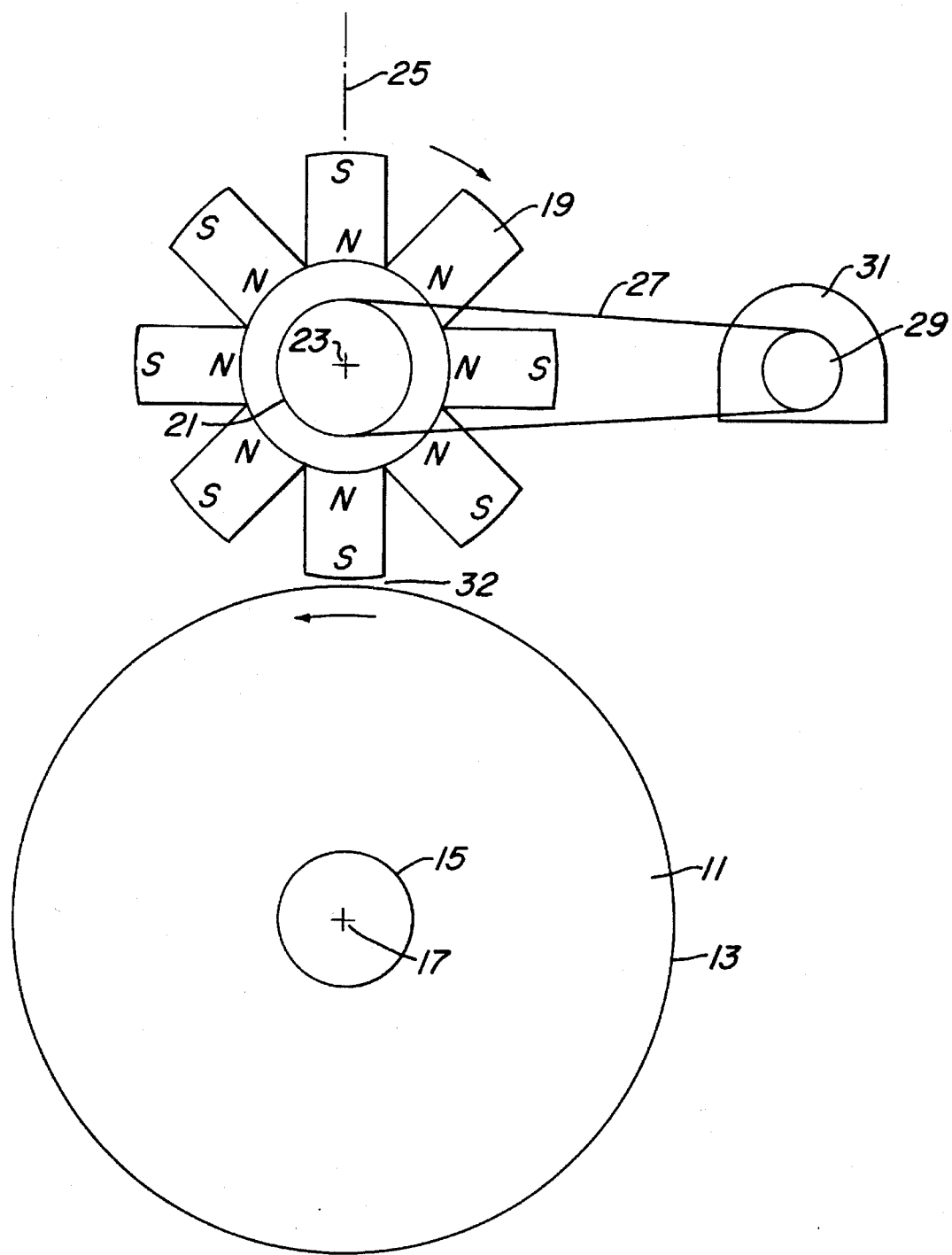
FIG. 1 is a schematic representation of an apparatus constructed in accordance with this invention for transferring rotational power from a drive shaft to an output shaft.

Referring to FIG. 1, object 11 is a wheel having a circular periphery 13. At least the periphery of object 11 is made of an electrical conductor that is nonmagnetic or nonferrous. The material is preferably aluminum, but also could be gold or silver. Object 11 is mounted on an object or driven shaft 15 for rotation therewith. Object shaft 15 has an object axis 17.

A plurality of magnet assembly comprising a plurality of magnets 19 is mounted adjacent to object 11. Magnets 19 in the embodiment shown comprise eight permanent bar magnets all joined and secured to a single common hub or shaft 21. Magnets 19 are oriented similar to spokes of a wheel, each extending radially from shaft 21, and equally spaced from each other. The lengths of magnets 19 are the same, with the outer tips defining a circular path of revolution.

Magnets 19 are strong ceramic magnets, each preferably able to lift approximately a four pound ferrous member. Magnets 19 will rotate with magnet shaft 21 about rotational axis 23. Each magnet 19 has a north-south axis 25. Each axis 25 is perpendicular to the rotational axis 23. In the embodiment shown, the south poles of each magnet 19 are located at the periphery, however, this is not critical. All or some of the north poles could be located at the periphery.

A rotational means is employed for rotating magnet shaft 21. This means could be a direct coupling to an electrical motor. Or, as shown in FIG. 1, it could be a drive belt 27 which extends over to a drive pulley 29. Drive pulley 29 is mounted to an electrical motor 31 for rotating drive belt 27. Preferably, the rotational means will rotate magnets 19 at a speed sufficient to provide a velocity at the outer tip or periphery of each magnet 19 in excess of 15 feet per second.

Magnet shaft 21 is positioned parallel to object shaft 15 and so that the periphery of each magnet 19 will rotate in close proximity to, but not touching, the circular periphery 13 of object 11. The clearance 32 is small enough such that a portion of object periphery 13 will be within the magnetic field or force of each magnet 19 when each magnet 19 is rotated next to periphery 13. Clearance 32 may be very small and is preferably less than one-half inch. The greater the clearance 32, the less rotational force is transferred from magnets 19 to object 11.

In operation, motor 31 is operated to rotate drive pulley 29. This causes belt 27 to rotate, which rotates magnet shaft 21. As magnet shaft 21 rotates, magnets 19 will rotate about magnet rotational axis 23, which is parallel to object axis 17. For reasons not clear, the rapidly moving magnetic force or field focused at the south poles of magnets 19 has an effect on the nonmagnetic object 11. This effect is to cause object 11 to rotate in the direction indicated by the arrow. The interface force causes the object 11 to rotate without any physical contact between magnets 19 and object 11. If clearance 32 is sufficiently close, object 11 will fairly quickly reach a proportional rotational speed with magnets 19, such that the tip velocities are the same.

Figure 2:
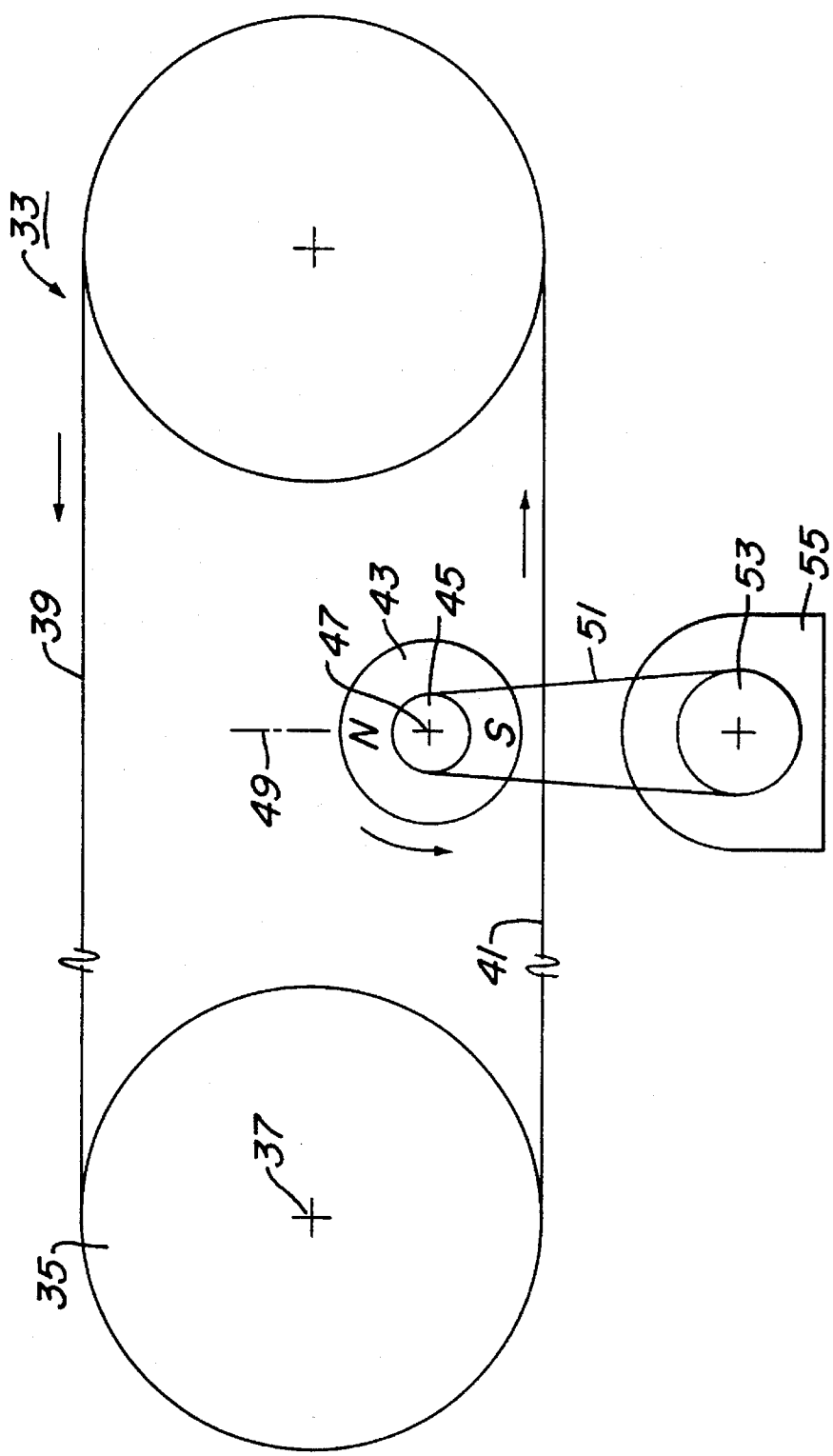
FIG. 2 is a schematic view of a conveyor belt assembly which is driven in accordance with this invention.

In the embodiment of FIG. 2, conveyor assembly 33 utilizes the same principles as shown in FIG. 1. Conveyor assembly 33 has a pair of spaced apart guide rollers 35, each with a guide axis 37. Guide rollers 35 are rotatable, and the guide axes 37 are parallel to each other. A conveyor belt 39 is placed around guide rollers 35. Guide rollers 35 are not driven, rather will rotate if conveyor belt 39 rotates. Conveyor belt 39 has an aluminized layer or surface 41, which is shown in FIG. 2 to be on the inner side, the side which contacts the guide rollers 35. The aluminized surface 41 is an electrical conductor, but is nonferrous and nonmagnetic.

The drive means for moving conveyor belt 39 comprises a magnet 43. Magnet 43 could be identical to the magnets 19 of FIG. 1. However, in this instance, it is shown to comprise only a single magnet, having a single north pole and a single south pole. Magnet 43 is mounted on a magnet shaft 45 which rotates about a magnet rotational axis 47. Magnet rotational axis 47 is parallel to guide axis 37. Magnet 43 has a magnet axis 49 that is perpendicular to magnet rotational axis 47. The periphery of magnet 43 is close to but not touching the aluminized surface 41, so as to place a portion of surface 41 within its magnetic field. Preferably, the clearance is less than one-half inch.

The drive means for rotating magnet 43 about magnet rotational axis 47 can be a direct coupling, or as shown schematically, it may comprise a drive belt 51. Drive belt 51 is mounted about a drive pulley 53 which is rotated by an electrical motor 55.

In the operation of the embodiment of FIG. 2, electrical motor 55 is operated to rotate magnet shaft 45. The tip velocity at the poles is preferably in excess of 15 feet per second. Magnet shaft 45 rotates magnet 43 about magnet axis 47. The magnetic force is interactive with conductive layer 41, causing movement of conveyor belt 39 as indicated by the arrows. There is no physical contact of magnet 43 with belt 39.

The invention has significant advantages. Nonferrous electrical conductors can be caused to move by rapidly moving a magnetic field in close proximity to the object. In the connection with power transfer, it can be used to rotate a driven shaft without physical connection. This reduces friction losses and the need for lubricant. It can be used to rotate a conveyor belt, reducing friction in the drive system.

It can also be employed for separation purposes, such as separating nonferrous electrical conductor pieces from ferrous pieces and nonferrous nonconductors. For example, a mixture of such pieces moving along a driven conveyor could be separated into three streams. A magnet would be mounted above the conveyor, at an oblique angle to the direction of movement of the conveyor, and rotating counter to the movement of the conveyor. Nonconductors pass straight under the magnet without effect. Ferrous pieces are attracted to the magnet, and continuously removed by a scraper. Nonferrous conductors are moved outward from the conveyor because of movement induced by the rotating magnet.

While the invention have been shown in two of its forms, it should be apparent to those skilled in the art that it is not limited, but it is susceptible to various changes without departing from the scope of the invention.

I claim:

1. A method of inducing rotation, comprising:

providing a metallic, nonferrous, electrically conductive object which has a circular periphery;

mounting the object about an object rotational axis with its circular periphery concentric with the object rotational axis such that the object is free to revolve about the object rotational axis;

providing a magnet which has a magnet rotational axis with a periphery of the magnet concentric with the magnet rotational axis, and a north-south axis of the magnet perpendicular to the magnet rotational axis, and positioning the periphery of the magnet side-by-side with the circular periphery of the object in close proximity to but not touching the circular periphery of the object, with the object rotational axis parallel to and offset from the magnet rotational axis such that at least a portion of the circular periphery of the object enters a magnetic field of the magnet; and rotating the magnet about the magnet rotational axis while at least a portion of the circular periphery of the object remains within the magnetic field so as to induce the object to revolve about the object rotational axis.

2. A method of inducing rotation, comprising:

providing a metallic nonferrous, electrically conductive object;

mounting the object for revolution about an object rotational axis;

providing a magnet with a north-south axis and a magnetic field;

mounting the magnet on a magnet rotational axis that is perpendicular to the north-south axis and substantially parallel with the object rotational axis; and rotating the magnet about the magnet rotational axis with a periphery of the magnet sufficiently close to the object, but not touching, so that at least a portion of the object is within the magnetic field of the magnet, thereby inducing full revolutions of the object about the object rotational axis; and wherein:

the object comprises a conveyor belt mounted for rotation about spaced apart guide rollers, each of the guide rollers having an object rotational axis, the object rotational axes being parallel to each other, the conveyor belt having a layer of electrically conductive, nonferrous material; and the step of rotating the magnet comprises positioning the magnet periphery close to the layer of the conveyor belt to induce rotation of the conveyor belt about the guide rollers.

3. A drive apparatus, comprising:

a metallic, nonferrous, electrically conductive object which has an object rotational axis and a circular periphery which is concentric with the object rotational axis;

mounting means for mounting the object for revolution about the object rotational axis;

a magnet having a periphery, a magnetic field, a north-south axis, and a magnet rotational axis which is concentric with the periphery and perpendicular to the north-south axis;

magnet mounting means for mounting the periphery of the magnet side-by-side with the circular periphery of the object in close proximity to but not touching the circular periphery of the object so that at least a portion of the circular periphery of the object is within the magnetic field, and with the magnet rotational axis parallel to and offset from the object rotational axis; and rotational means for rotating the magnet about the magnet rotational axis while its periphery remains in close proximity to the circular periphery of the object to induce the object to revolve about the object rotational axis.

4. A drive apparatus, comprising:

a metallic, nonferrous, electrically conductive object;

mounting means for mounting the object for revolution about an object rotating axis;

a magnet having a magnetic field and a magnet rotational axis;

magnet mounting means for mounting the magnet in close proximity to but not touching the object so that at least a portion of the object is within the magnetic field; and rotational means for rotating the magnet about the magnet rotational axis while remaining in close proximity to the object to induce the object to revolve about the object rotational axis; and wherein:

the object comprises a conveyor belt mounted for rotation about spaced apart guide rollers, the conveyor belt having an aluminized layer.

5. A rotational power transfer apparatus, comprising in combination:

a rotatable object shaft;

a metallic, nonferrous, electrically conductive object mounted to the object shaft for rotation therewith, the object having a circular periphery:

a magnet shaft mounted parallel to and offset from the object shaft;

a magnet mounted to the magnet shaft for rotation therewith, the magnet having a magnetic field and a north-south axis that is perpendicular to the magnet shaft, the magnet having a periphery positioned side-by-side with the circular periphery of the object in close proximity to but not touching the circular periphery of the object so that at least a portion of the object enters the magnetic field; and drive means for rotating the magnet shaft and thereby the magnetic field while the periphery magnet remains in close proximity to the circular periphery of the object to induce rotation of the object and the object shaft.

6. A conveyor apparatus, comprising in combination:

a pair of spaced apart guide rollers, each having an object axis, the object axes being parallel to each other;

a conveyor belt extending about the guides, the conveyor belt having a layer of a metallic, nonferrous, electrically conductive material thereon;

a magnet shaft mounted parallel to the object axes;

a magnet having a magnetic field, the magnet being mounted to the magnet shaft for rotation therewith and positioned in close proximity to but not touching the layer of the conveyor belt such that a portion of the layer is within the magnetic field; and drive means for rotating the magnet shaft and thereby the magnet field while the magnet remains in close proximity to the layer of the conveyor belt to induce rotation of the conveyor belt about the guide rollers.

7. The apparatus according to claim 6, wherein the magnet has a north-south axis that is perpendicular to the magnet shaft.

* * * * *